(12) United States Patent
Rueger et al.

(10) Patent No.: US 8,912,496 B2
(45) Date of Patent: Dec. 16, 2014

(54) APPARATUS WITH OPTICAL FUNCTIONALITY AND POWER MANAGEMENT AND ASSOCIATED METHODS

(75) Inventors: Timothy T. Rueger, Austin, TX (US); William Hong, Austin, TX (US); David Andreas, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 673 days.

(21) Appl. No.: 12/954,639

(22) Filed: Nov. 25, 2010

(65) Prior Publication Data

US 2011/0248172 A1     Oct. 13, 2011

Related U.S. Application Data

(60) Provisional application No. 61/323,798, filed on Apr. 13, 2010.

(51) Int. Cl.

| | | |
|---|---|---|
| *G01J 5/02* | (2006.01) | |
| *G01S 7/491* | (2006.01) | |
| *G01S 17/02* | (2006.01) | |
| *G01S 7/497* | (2006.01) | |
| *G01S 17/46* | (2006.01) | |
| *G01V 8/20* | (2006.01) | |
| *G01S 3/78* | (2006.01) | |
| *G01S 11/12* | (2006.01) | |
| *G01S 3/783* | (2006.01) | |
| *G01S 7/481* | (2006.01) | |

(52) U.S. Cl.
CPC .............. *G01V 8/20* (2013.01); *G01S 7/4913* (2013.01); *G01S 17/026* (2013.01); *G01S 7/4972* (2013.01); *G01S 17/46* (2013.01); *G01S 3/7803* (2013.01); *G01S 11/12* (2013.01); *G01S 7/497* (2013.01); *G01S 3/7835* (2013.01); *G01S 7/4811* (2013.01)
USPC ..................................................... 250/341.1

(58) Field of Classification Search
USPC ......... 250/341.1–341.8, 214 R, 214 P, 214 D, 250/214 A, 214, 214 LS, 214 VT, 214 PR, 250/214 SG, 214.1, 214 AG, 214 AL, 214 B, 250/214 C, 214 DC, 214 L, 214 RC, 214 SF, 250/214 SW
See application file for complete search history.

(56) References Cited

U.S. PATENT DOCUMENTS

| | | | |
|---|---|---|---|
| 6,373,057 B1 * | 4/2002 | Penfold ...................... 250/341.8 |
| 6,726,106 B1 * | 4/2004 | Han et al. ................... 235/472.01 |

(Continued)

OTHER PUBLICATIONS

U.S. Appl. No. 12/954,637, filed Nov. 25, 2010, Rueger et al.

*Primary Examiner* — David Porta
*Assistant Examiner* — Taeho Jo
(74) *Attorney, Agent, or Firm* — Law Offices of Maximilian R. Peterson

(57) ABSTRACT

In an exemplary embodiment, an apparatus includes a sensor integrated circuit (IC) that is adapted for ambient light sensing (ALS) and/or proximity detection. The sensor integrated circuit (IC) includes an integrated analog-to-digital converter (ADC) that is adapted to convert at least one signal related to ambient light sensing (ALS) and/or proximity detection to at least one digital signal, and an integrated light emitting diode (LED) driver that is adapted to drive at least one LED. The sensor IC also includes an integrated power management unit (PMU) that is adapted to reduce power dissipation of the sensor IC by running at a low duty cycle the integrated LED driver and the integrated ADC.

24 Claims, 12 Drawing Sheets

(56) References Cited

U.S. PATENT DOCUMENTS

| | | | |
|---|---|---|---|
| 7,311,406 B2 * | 12/2007 | Schofield et al. | 359/604 |
| 7,411,195 B2 * | 8/2008 | Narasako et al. | 250/338.3 |
| 8,008,613 B2 * | 8/2011 | Tam | 250/226 |
| 2009/0027652 A1 * | 1/2009 | Chang et al. | 356/4.01 |
| 2011/0180693 A1 * | 7/2011 | Ritter et al. | 250/214 A |
| 2011/0180709 A1 * | 7/2011 | Craddock et al. | 250/338.1 |

* cited by examiner

APPARATUS WITH OPTICAL FUNCTIONALITY AND POWER MANAGEMENT AND ASSOCIATED METHODS

CROSS-REFERENCE TO RELATED APPLICATIONS

This application claims priority to, and incorporates by reference, U.S. Provisional Patent Application Ser. No. 61/323,798, filed on Apr. 13, 2010, titled "Apparatus with Optical Functionality and Associated Methods".

TECHNICAL FIELD

The disclosed concepts relate generally to electronic apparatus and, more particularly, to electronic apparatus with optical functionality, related systems, and associated methods.

BACKGROUND

Relatively recent technical advances have resulted in the use of several technologies in a one product. For example, mobile devices, such as mobile telephones, portable computing devices, personal digital assistants (PDAs), and the like may include electronic circuitry as well optical functionality.

The use of both electronic circuitry and optical functionality allows the device to provide new features, additional functionality, and/or convenience. For example, a device may sense ambient light levels and adjust display contrast or brightness accordingly. As another example, a device may sense proximity to an object or user, and turn off or turn on the display (e.g., a mobile telephone may turn off the display when the user holds the telephone close to his/her face or ear).

SUMMARY

The disclosure relates generally to electronic apparatus and, more particularly, to electronic apparatus with optical functionality, related systems, and associated methods. In an exemplary embodiment, an apparatus includes a sensor integrated circuit (IC) that is adapted for ambient light sensing (ALS) and/or proximity detection. The sensor IC includes an integrated analog-to-digital converter (ADC), an integrated light emitting diode (LED) driver, and an integrated power management unit (PMU). The integrated ADC is adapted to convert at least one signal related to ambient light sensing (ALS) and/or proximity detection to at least one digital signal. The integrated LED driver is adapted to drive at least one LED. The integrated PMU is adapted to reduce power dissipation of the sensor IC by running at a low duty cycle the integrated LED driver and the integrated ADC.

In another exemplary embodiment, a method of sensing light using a sensor IC includes (i) running the sensor IC in a sleep mode, and (ii) running the sensor IC in a convert mode upon occurrence of at least one condition. During the convert mode the sensor IC converts at least one signal related to ambient light sensing (ALS) and/or proximity detection to at least one digital signal. The method further includes running the sensor IC into a process mode to process the at least one digital signal.

In yet another exemplary embodiment, a method of sensing light using a sensor IC includes running an LED driver to drive at least one LED, and sensing ambient light and/or reflected light from an object for proximity detection to generate at least one analog signal. The method further includes running with a low duty cycle an ADC to convert the at least one analog signal into at least one digital signal.

BRIEF DESCRIPTION OF THE DRAWINGS

The appended drawings illustrate only exemplary embodiments and therefore should not be considered as limiting its scope. The disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to electronic circuitry and/or systems that also have optical functionality. In exemplary embodiments, the optical functionality may include proximity sensing, ambient light sensing (ALS), or both. The ALS functionality may include sensing of visible light, infrared (IR) light, or both, as desired.

Figure 1:
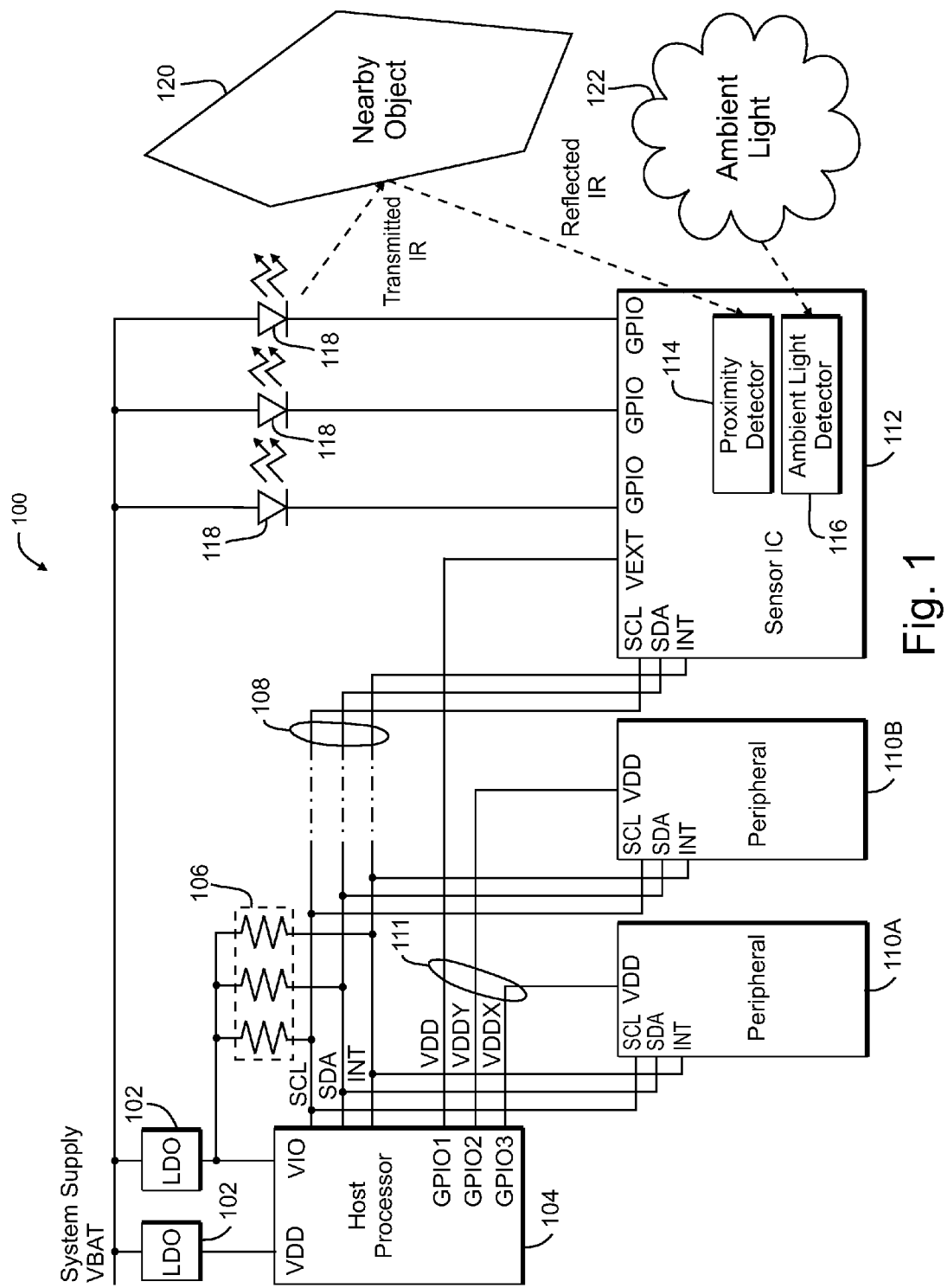
FIG. 1 illustrates a block diagram of a system according to an exemplary embodiment.

One aspect of the disclosed concepts relates to systems that include optical functionality. FIG. 1 illustrates a simplified block diagram of a system 100 according to an exemplary embodiment. Specifically, FIG. 1 shows a low-power (i.e., relatively low-power consumption) host system 100 incorporating a sensor IC 112 (or more than one sensor IC, as desired) for optical functions.

Referring to FIG. 1, the system 100 uses a host processor or controller 104 to govern the overall or system-wide functionality. More specifically, the host controller 104 interfaces to one or more peripherals, labeled 110A-110B, on a shared serial bus 108, with pull-up resistors 106. The peripherals 110A-110B may constitute any desired device, circuit, system, or subsystem, as desired. Examples include displays, keys, buttons, keypads or keyboards, touch devices (input and/or output), audio devices, indicators (light emitting diodes (LEDs), lights), actuators, sensors, etc. Note that in some embodiments, the bus may be a parallel bus, or the system 100 may use both serial and parallel buses, as desired.

One or more low drop-out (LDO) regulators 102 provide power to the host controller 104 and/or other system components from a system supply source (labeled VBAT in FIG. 1). Through one or more general-purpose input-output (GPIO)

terminals 111, the host controller 104 can manage power provided to a peripheral (e.g., 110A or 110B, or more than one peripheral) by driving its power or supply input to ground with a digital output pin (e.g., VDD, VDDX, VDDY). When powered off, however, the peripheral(s) may not load the shared serial bus, thus allowing the host controller 104 and other peripherals to use the bus.

In exemplary embodiments, the host system implementation eliminates the secondary regulators or switches in a system. The host system may thus be optimized for relatively low cost and power consumption.

In exemplary embodiments, the host controller or processor 104 may constitute a controller, microcontroller, processor, microprocessor, field-programmable gate array (FPGA), programmable controller, or the like, as desired. In exemplary embodiments, the host processor 104 may include one or more of integrated RAM (including program RAM, as desired), ROM, flash memory (or non-volatile memory generally), one-time programmable (OTP) circuitry, analog-to-digital converters (ADCs), digital-to-analog-converters (DACs), counters, timers, input/output (I/O) circuitry and controllers, reference circuitry, clock and timing circuitry (including distribution circuitry), arithmetic circuitry (e.g., adders, subtracters, multipliers, dividers), general and programmable logic circuitry, power regulators, and the like, as desired. Integrating one or more of the circuitry described above can improve the overall performance in some applications, for example, flexibility, responsiveness, die area, cost, materials used, power consumption, reliability, robustness, and the like, as desired.

The host controller 104 uses the bus 108 to also communicate with the sensor IC 112. In the embodiment shown, the sensor IC 112 provides proximity sensing or detection, ambient light sensing or detection, or both, as desired, via the proximity detector 114 and the ambient light sensor or detector 116, respectively.

Specifically, the diode(s) 118 radiate IR light. Nearby object 120 reflects some of the radiated IR light towards the sensor IC 112. The proximity detector 114 detects some of the radiated IR light. Based on characteristics of the detected IR light (e.g., its intensity or level), the proximity detector 114 may provide information about the nearby object 120, for example, its distance from the sensor IC 112 or the proximity detector 114.

As noted, the ambient light detector 116 detects ambient light. Specifically, the ambient light detector 116 may provide information about the characteristics of ambient light, such as its intensity, type, or level. Based on that information, the system 100 may provide information to another apparatus, circuit, or system, for example, circuitry within a mobile telephone (not shown explicitly). As a result, the mobile telephone might take one or more actions, for example, adjusting the brightness and/or contrast of a display, depending on the level of ambient light.

Figure 2:
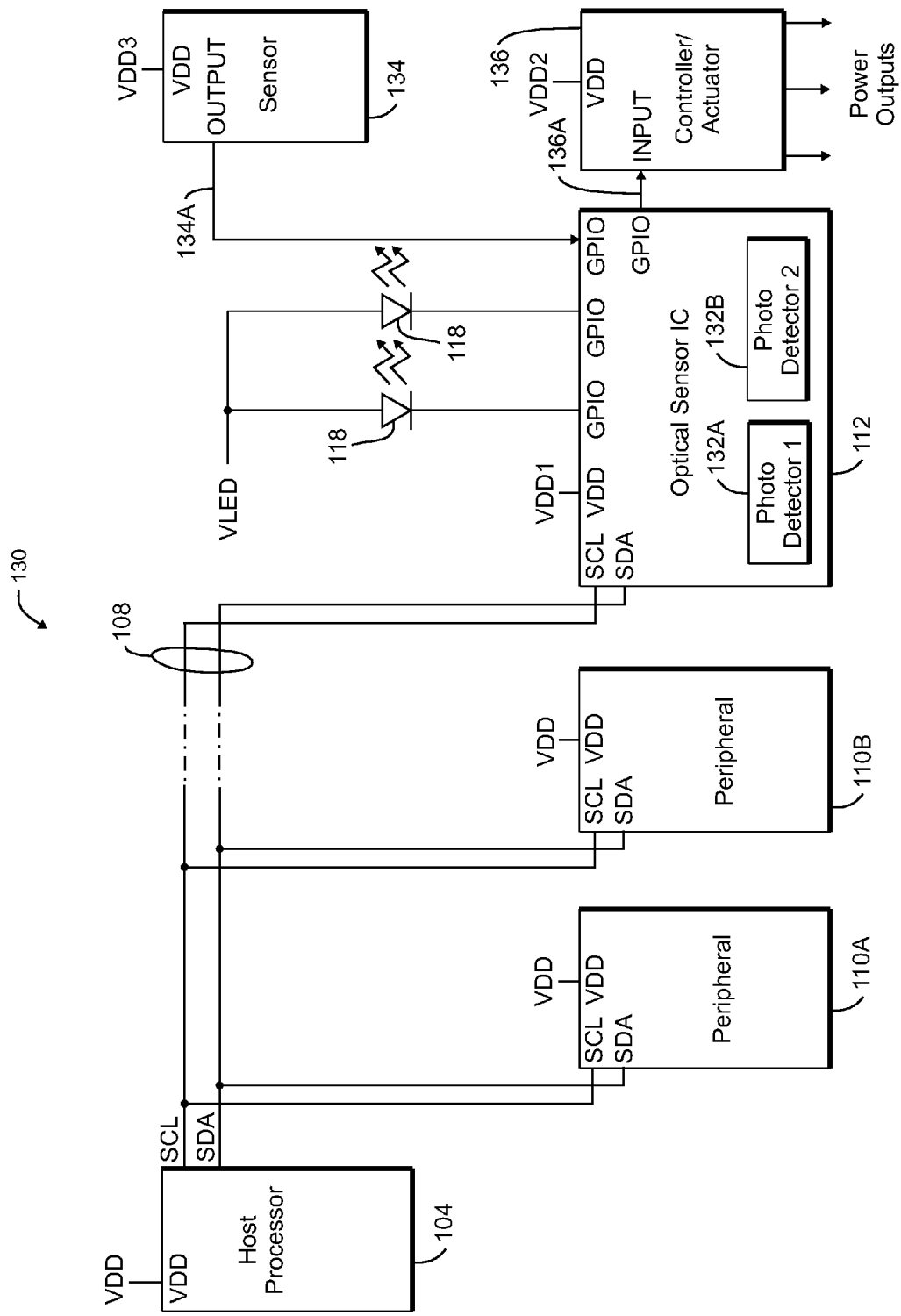
FIG. 2 depicts a block diagram of a system according to another exemplary embodiment.

FIG. 2 depicts a simplified block diagram of a system 130 according to another exemplary embodiment. Some features of the system 130 are similar to the embodiment in FIG. 1, for example, the host processor or controller 104, the peripherals 110A-110B, the bus 108, the IR LEDs 118, etc. The embodiment in FIG. 2, however, shows how one may take advantage of the configurable features of the system, for example, certain features in the GPIOs.

Specifically, the sensor 134 measures or determines the quantity of some stimulus (for example, the level of a current or voltage, etc.), and provides the measured value to the sensor IC 112 via the GPIO 134A. The sensor IC 112 may communicate the measured value and/or quantities derived from it to the processor 104, and may receive information from the processor 104 that it may use to conduct or perform its operations.

The sensor IC 112 may also receive information or signals form the photo detectors 132A-132B. The information may include optical signals. In some embodiments, the photo detector 132A may constitute a proximity detector, such as the proximity detector 114 in FIG. 1. Referring to FIG. 2, in some embodiments, the photo detector 132B may constitute an ambient light detector, such as the ambient light detector 116.

Based on information from the optical detector(s) 132A-132B and/or information (including instructions) from the processor 104, the sensor IC 112 may provide information to the controller or actuator 136 via the GPIO 136A. The information may include commands or instructions, for example, to activate and/or determine the functionality and/or operation of the controller or actuator 136. In response, the controller or actuator 136 may provide one or more outputs to other components or circuits (not shown explicitly) in the system 130, for example, power and/or control signals.

According to another aspect of the disclosed concepts, multiple sensor ICs may be used in an apparatus or system, as desired. The inclusion of multiple sensor ICs can provide additional or enhanced system or device capability or functionality.

Figure 3:
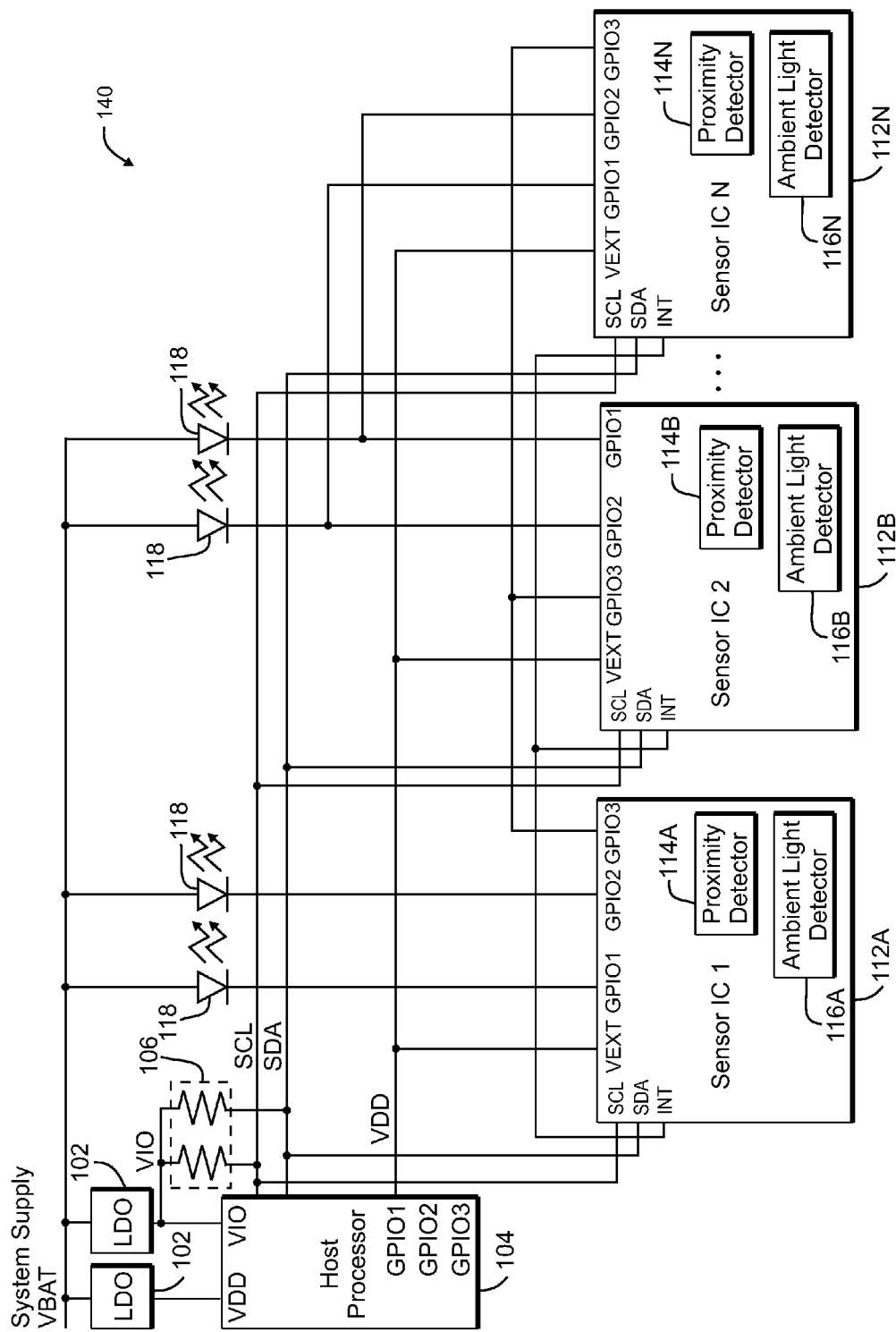
FIG. 3 shows a block diagram of a system according to another exemplary embodiment that includes multiple sensor ICs.

FIG. 3 shows a simplified block diagram of a system 140 according to an exemplary embodiment, which includes multiple sensor ICs. Specifically, the system 140 includes a plurality of sensor ICs 112A-112N (labeled as "Sensor IC 1" to "Sensor IC N," respectively). One or more of the sensor ICs 112A-112N may provide one or more of the optical functions described above (e.g., proximity detection, ambient light sensing).

In the embodiment shown in FIG. 3, individual GPIOs may be configured to allow operation of multiple optical sensor ICs 112A-112N in system 140. It may be desirable in some applications to synchronize operation of individual sensor ICs to prevent interference, and/or share resources. As an example, in the embodiment shown in FIG. 3, Sensor IC1 and Sensor IC2 are synchronized using signals INT and/or GPIO3, and use local LED resources. Note that the sensor IC 112A may use LED resources coupled to the sensor IC 112B by means of synchronization communication between the sensor ICs 112A-112B.

Furthermore, note that the sensor ICs 112B and 112N are synchronized by means of GPIO3 and/or INT or GPIO1, GPIO2 and they share LED resources coupled to both by means of synchronization communication between the sensor ICs 112B and 112N. One or more of the optical sensor ICs coupled to the system can communicate by dedicated GPIOs and synchronize their operation among each other and/or with host processor 104, as desired.

Other system functions may include control and monitoring functions and digital-to-charge conversion. Additional sensors or controllers/actuators may be part of the system and directly controlled by one or more of the sensor ICs 112A-112N to further enhance system capability. Note that the embodiments shown in the figures provide examples of systems incorporating sensor ICs according to the disclosed concepts. One or more such sensor ICs may be used in a variety of other configurations and systems, as desired, by making appropriate modifications. Such modifications fall within the knowledge and skill of persons of ordinary skill in the art.

One aspect of the disclosed concepts relates to sensor ICs (for example, the sensor IC 112 in FIGS. 1-2 or, generally, any of the sensor ICs discussed above) optimized for use in various host systems, for example, the systems described above. In one exemplary embodiment, a sensor IC may perform optical reflectance proximity, motion, and ambient light functions with high sensitivity and reduced, optimized, and/or minimal power consumption.

In exemplary embodiments, the IC provides a host processor with digital measurements of light energy as sensed by on-chip photodiodes through a transparent IC package (or off-chip sensors, as desired). In exemplary embodiments, proximity and motion are measured by illuminating one or more external infrared LEDs (e.g., the LEDs 118) and sensing the reflected infrared light. In some exemplary embodiments, ambient light is measured by sensing incident infrared and visible light and optionally applying photopic correction.

In exemplary embodiments, relatively high sensitivity may be achieved by a direct coupling of the photodetectors to a delta-sigma ADC, having relatively high-resolution, via a multiplexer (MUX), and using per-measurement calibration, as desired. As described below in detail, operation with relatively low power consumption may be achieved by operating the LED drivers, ADC, and controlling circuitry at a relatively low duty cycle. Continuous power consumption in other blocks is kept to a minimum and/or relatively low or optimized levels. Operating the LED drivers, ADC, and controlling circuitry at low duty cycles reduces the power dissipation in the sensor IC and, hence, a system in which the sensor IC may reside.

In some embodiments, the host processor or controller and the sensor IC (including some or all of the blocks of circuitry described in this document, for example, photodiodes or detectors) may be integrated within one IC or device, as desired. In some embodiments, the host processor and the sensor IC may be integrated within a single semiconductor die, as desired. The integration of the host processor and the sensor IC (whether on a single die, within a multi-chip module (MCM), etc.) may provide advantages in some applications, for example, higher speed, lower cost, etc.

Figure 4:
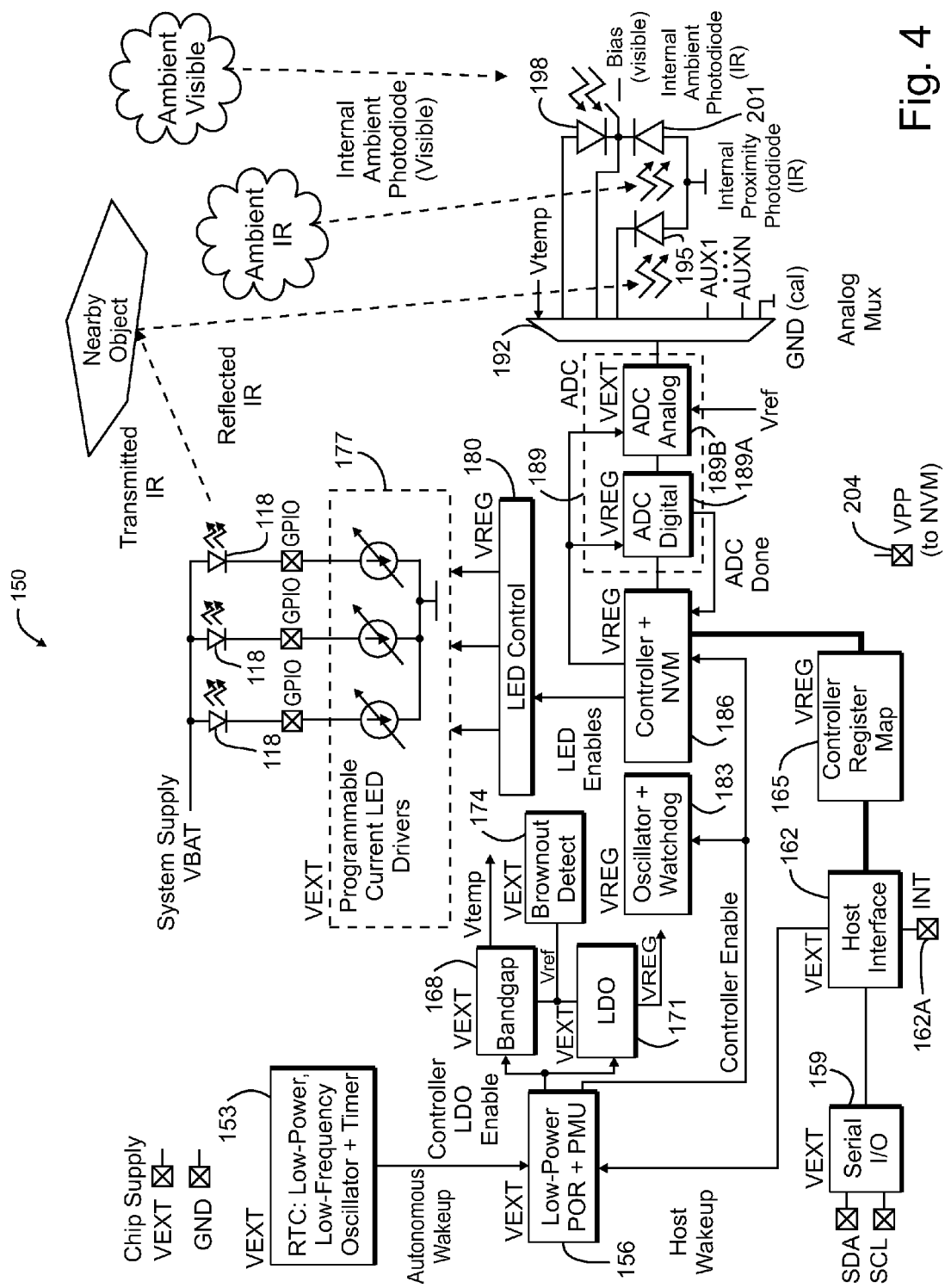
FIG. 4 depicts a block diagram of a circuit arrangement that includes a sensor IC according to an exemplary embodiment.

FIG. 4 illustrates a simplified block diagram of a circuit arrangement 150 that includes a sensor IC according to an exemplary embodiment. The sensor IC includes the following blocks or circuitry: Power-on Reset (POR) 156, Power Management Unit (PMU) 156, Real-Time Clock (RTC) 153, serial I/O 159, host interface 162, bandgap reference 168, digital low-drop-out (LDO) regulator or circuit 171, brown-out detector 174, oscillator with watchdog timer 183, controller 186 (including, as desired, non-volatile memory (NVM)), register map 165, output control 180, GPIOs with programmable fixed-current drivers 177, photodetectors 195, 198, and 201 (which may be internal, i.e., integrated, or external, as desired), analog MUX 192, ADC 189, and other I/O pins (e.g., interrupt pin 162A for host interface 162). The following sections of this document provide descriptions and exemplary embodiments of the blocks/circuits.

Photodetector 195 detects or senses light, for example, infrared light in order to determine proximity of a nearby object. Photodetector 198 detects or senses light, for example, ambient visible light. Photodetector 201 detects or senses light, for example, ambient infrared light.

On initial power up, the POR circuit 156 holds the sensor IC in reset until a safe level for the supply voltage is attained. Once the POR is released, the PMU circuit 156 (shown as part of the POR circuit 156) starts the bandgap reference 168 and the digital core LDO 171, waiting until after the LDO level is settled before starting the oscillator 183 and the controller 186. After chip initialization, the controller 186 signals PMU 156 to put the sensor IC into sleep mode (to reduce power consumption). Note that, depending on application, the PMU 156 may not place the sensor IC into sleep mode (cause the sensor IC to enter the sleep mode), as desired.

In one exemplary embodiment, for on-demand operation(s), the PMU 156 wakes up the sensor IC (or other circuitry in the sensor IC) upon receiving a wake-up signal from the host interface 162. After waking up, the controller 186 decodes the incoming host command and performs the requested operation(s).

In one exemplary embodiment, in autonomous mode, the PMU 156 wakes up the sensor IC after receiving a signal from an internal programmable timer, and performs operation(s) autonomously as previously specified by the host (not shown explicitly).

After an operation is completed, the controller 186 signals the PMU 156 to put the sensor IC into sleep mode until the next operation. This power-management scheme conserves power by shutting down high-power blocks when their functions are not needed or used.

Since in exemplary embodiments it is powered continuously, analog circuitry inside the PMU 156 is designed using relatively low-power biasing to reduce or minimize power consumption, given that, in typical applications, the IC spends the most time in sleep mode.

A low-power, low-frequency on-chip oscillator 153 is used to clock a timer (shown as part of oscillator 153). The timer is programmable by the host processor (not shown explicitly) to control the rate of light measurements in autonomous mode. The oscillator 153 uses relatively low-power biasing to minimize power consumption. In applications where the sensor IC spends most of the time (or a relatively large percentage of the time) in sleep mode, this property is desirable as it reduces power consumption. The oscillator 153 may be calibrated to reduce or minimize the effects of semiconductor fabrication process variations on its output frequency.

A serial input/output interface 159 is used to communicate with the host processor (not shown explicitly) over a serial protocol, such as I2C or SMB although one may use other types of protocol depending on factors such as given specifications or intended applications. In one such serial protocol, one line is used as a clock (SCL), while another is a bidirectional data line (SDA). These are used to send control information or read light measurements or status to/from the sensor IC.

In exemplary embodiments, the serial clock, serial data, and interrupt I/O structures are designed to allow the sensor IC 112 to be powered down while not loading the shared data lines in the host system. Similarly, the LED I/O structures allow sensor IC 112 to be powered down while not drawing current from the shared or independent LED power supply. This allows the sensor IC 112 to be powered from a host processor I/O pin, thus simplifying system power management and reducing system cost.

The host interface 162 connects the serial I/O block to the internal controller 186 via the controller register map 165. The controller register map 165 contains control registers, parameters, and measured data. Some registers are shared with the internal controller 186. Upon receipt of an appropriate command from the host, the host interface 162 sends a wakeup signal to the PMU 156 to initiate an on-demand light reading. The host interface 162 also controls an interrupt pin 162A for alerting the host processor when a light reading is available, when a light reading exceeds a prescribed threshold, or other events, as desired.

In the exemplary embodiment shown in FIG. 4, the sensor IC has process and convert modes. In those modes, the LDO regulator 171 powers the high-speed oscillator 183, the controller 186, and the ADC digital circuitry 189A. In sleep mode, the LDO 171 is powered down by the PMU 156. During this mode, the controller and register map states are maintained by the use of data retention flip-flops (not shown explicitly) that use the external power supply to latch their held values.

The brownout detection circuit 174 provides a failsafe for drops in the sensor IC's external voltage supply. It compares the supply level (or a scaled version of it) to the bandgap reference voltage from bandgap circuit 168, and signals the PMU 156 when the supply falls below a specified level. The brownout detection voltage level may be calibrated to minimize the effect of semiconductor fabrication process variations.

The high-speed on-chip oscillator 183, powered by the LDO regulator 171, is used to clock the controller 186 and the ADC 189. In the process mode of the sensor IC, the oscillator 183 clocks the controller 186. In the convert mode, the oscillator 183 clocks the ADC 189, while processing by the controller 186 is suspended. In the sleep mode, the oscillator 183 is powered down with the rest of the digital blocks powered from the digital LDO 171. The oscillator 183 may be calibrated to minimize the effect of semiconductor fabrication process variations on its output frequency.

A watchdog timer (shown as part of the oscillator 183) may be included to monitor transitions on the output of the oscillator 183. If a predetermined amount of time passes without a clock edge, a clock failure signal may be sent to the PMU 156 for handling of the clock failure. In some embodiments, the watchdog timer may generate a reset signal for the sensor IC under these or other desired circumstances.

In exemplary embodiments, the controller 186 constitutes a flexible programmable controller, used to coordinate the operations of the various blocks of the sensor IC. In exemplary embodiments, it receives commands from the host interface 162, configures and enables the GPIOs, configures the ADC 189 and the analog MUX 192, controls the ADC 189, receives data from the ADC 189, and sends data to the host interface 162. In exemplary embodiments, controller 186 uses analog MUX 192 to select among any photodetectors on sensor IC 112, auxiliary internal or external signals, or external sensors via dedicated I/Os. A zero-signal input may be selected for purpose of per-reading calibration. The temperature voltage output from the bandgap reference circuit (described below in detail) may also be selected for digitizing the temperature.

ADC 189 is used to convert the level or intensity of incident light to a digital word for on-chip and host processing. In exemplary embodiments, ADC 189 is a current-input incremental-mode second-order delta-sigma modulator. The 1-bit data output stream is double-integrated to provide an output code proportional to the incoming light level.

In exemplary embodiments, the controller 186 may constitute a controller, microcontroller, processor, microprocessor, field-programmable gate array (FPGA), programmable controller, or the like, as desired. In exemplary embodiments, the controller 186 may include one or more of integrated RAM (including program RAM, as desired), ROM, flash memory (or non-volatile memory generally), one-time programmable (OTP) circuitry, analog-to-digital converters (ADCs), digital-to-analog-converters (DACs), counters, timers, input/output (I/O) circuitry and controllers, reference circuitry, clock and timing circuitry (including distribution circuitry), arithmetic circuitry (e.g., adders, subtracters, multipliers, dividers), general and programmable logic circuitry, power regulators, and the like, as desired.

In exemplary embodiments, program software is stored in nonvolatile memory (NVM). In exemplary embodiments, the NVM is designed to be immune or substantially immune to ambient light by using a dedicated light shield, for example, a metal shield). Ambient light effects on the sensor IC (except the photodetectors) should be minimized or reduced, given that the sensor IC is packaged in a light-transparent encapsulation.

When operating in the process mode, the controller 186 functions according to its stored program. Integrating one or more of the circuitry described above can improve the overall performance in some applications, for example, flexibility, responsiveness, die area, cost, materials used, power consumption, reliability, robustness, and the like, as desired.

The controller 186 provides different functionality depending on the mode of operation of the sensor IC. In the convert mode, the controller clock is interrupted while the ADC 189 performs analog-to-digital conversion of the incoming light signal. This scheme both conserves power and provides a quieter environment (from a noise and/or EMI/EMC point-of-view) for precision analog-to-digital conversion. The controller clock is restarted after the ADC operation is completed. In the sleep mode, the controller 186 is powered down to conserve power. Controller state is maintained by the use of data retention flip-flops (not shown explicitly) that use the external power supply to latch their held values, as described above.

The register map 165 contains status, control, and data for the sensor IC. Some register values are shared with the host interface 162 to transfer commands and data to or from the host interface 162. In the sleep mode, register map state is maintained by the use of data retention flip-flops that use the external power supply to latch their held values. In the sleep mode, register map state is maintained by the use of data retention flip-flops (not shown explicitly) that use the external power supply to latch their held values.

The output block 180, labeled as "LED control" in FIG. 4, interfaces the controller 186 to the GPIO drivers (or LED drivers) 177. Depending on the requested function, the output control block 180 configures and powers up the output drivers 177 with the prescribed current level. The output control is flexible, and allows using any combination of output drivers sequentially or simultaneously for measurement, as desired. The output driver(s) 177 may be independently controlled for different current levels, as desired.

In exemplary embodiments, a separate pin 204 may be used to provide the relatively high programming voltage (labeled "VPP") used by the NVM during manufacturing. It may not be coupled or used in the end system or user application. In other exemplary embodiments, this functionality may be realized using a shared pin and internal multiplexing, as desired.

As noted, sensor ICs according to exemplary embodiments may include one or more bandgap voltage and/or current reference circuits. In an exemplary embodiment, the sensor IC includes a temperature-compensated voltage reference, a temperature-compensated current reference, and a temperature sensor.

In other embodiments, one may omit one or more of the foregoing items. For example, in some embodiments, the sensor IC may omit the temperature-compensated voltage reference or the temperature-compensated current reference. If included, the voltage reference is used to set the output voltage of the digital LDO, the full-scale level of the ADC, and the trip level of the brownout detector. The voltage reference may be calibrated to minimize the effect of semiconductor fabrication process variations.

The current reference provides bias currents to the ADC and the LED drivers. In exemplary embodiments, the current reference is implemented in a relatively area-efficient manner that can also provide temperature compensation, as desired. A temperature sensor provides a voltage that is proportional to absolute temperature. This voltage may be digitized by the ADC to provide either temperature readings to the host or provide for temperature correction of photodetector measurements. To save power, the temperature sensor may be disabled by the host, as desired.

Figure 5:
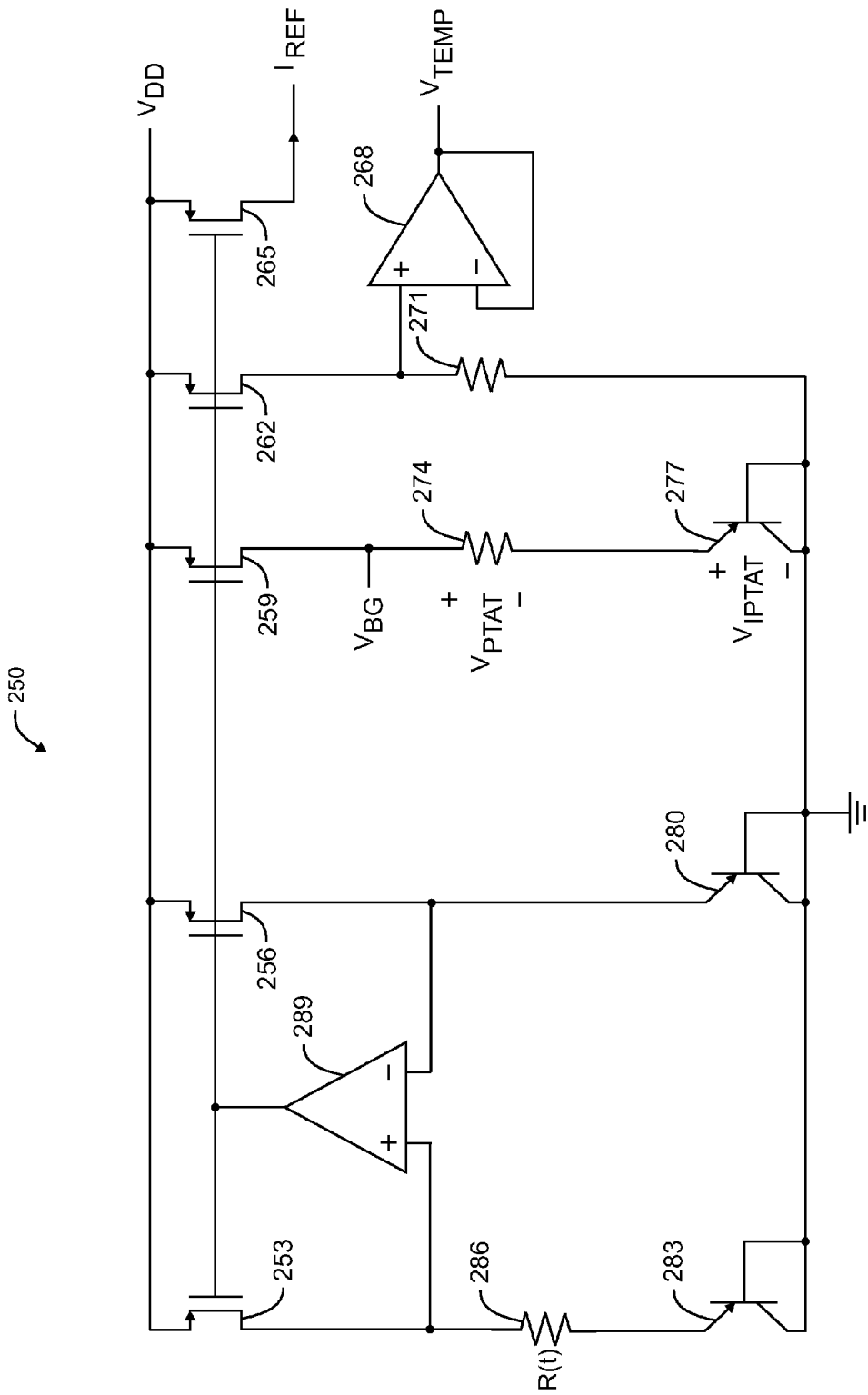
FIG. 5 illustrates a block diagram of a reference circuit according to an exemplary embodiment.

FIG. 5 illustrates a block diagram of a reference circuit 250 according to an exemplary embodiment. Reference circuit 250 provides a temperature-compensated bandgap voltage (or current, by making appropriate modifications known to persons of ordinary skill in the art), a temperature-compensated current, and a temperature sensor (i.e., a voltage that varies proportionally to temperature). Transistors 280 and 283, resistor 286, difference amplifier 289, and transistors 253 and 256 form a bandgap circuit, as known to persons of ordinary skill in the art. Transistors 253, 256, 259, 262, and 265 have the same or substantially same gate-source voltage, and therefore form a current mirror.

Transistor 259 supplies current to resistor 274 and transistor 277. Resistor 274 and transistor 277 provide a bandgap voltage, $V_{BG}$. Resistor 274 allows the changing or trimming of the bandgap voltage. In exemplary embodiments, resistor 274 may have taps or may be variable. In exemplary embodiments, resistor 274 may be trimmed or changed at production time, and its value may be stored in the sensor IC, for example, by using OTP memory, flash memory, and the like.

The voltage across transistor 277, $V_{IPTAT}$, has an inverse or negative temperature coefficient, whereas the voltage across resistor 274, $V_{PTAT}$, has a direct or positive temperature coefficient. Transistor 277 and resistor 274 may be designed, selected, or configured (during design, production, and/or use) so that variations in the voltage $V_{IPTAT}$ and the voltage $V_{PTAT}$ as a result of changes in temperature cancel each other or substantially cancel each other or tend to cancel each other. Consequently, the voltage $V_{BG}$ is independent of temperature or is substantially independent of temperature or tends to be independent of temperature.

Transistor 262 supplies current to resistor 271. The voltage across resistor 271 varies as a function of temperature. Buffer 268 presents a relatively high impedance to resistor 271 and transistor 262, and buffers the voltage across resistor 271. The output of buffer 268 provides a temperature-dependent voltage, $V_{TEMP}$.

Transistor 265 supplies a reference current, $I_{REF}$. The reference current may supply current to various circuitry within or external to the sensor IC. For example, in exemplary embodiments, the reference current may serve as a bias current for various circuitry, a reference current for comparison to other currents, etc.

Figure 6:
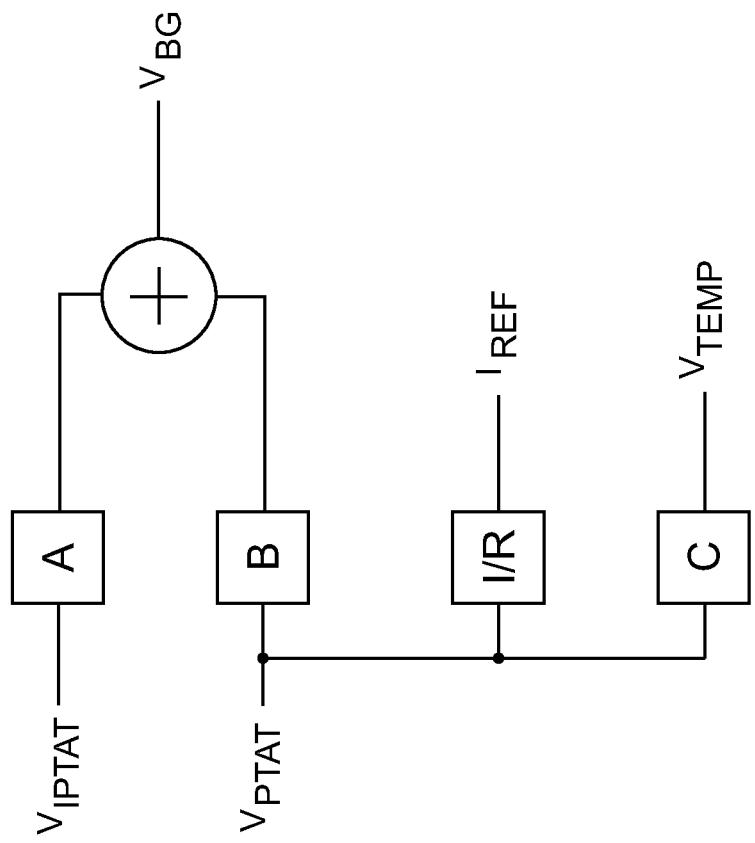
FIG. 6 depicts a block diagram representation of signal flow in a reference circuit according to an exemplary embodiment.

FIG. 6 depicts a block diagram representation or signal flow diagram in a generalized reference circuit according to an exemplary embodiment. Thus, the block diagram in FIG. 6 may correspond to reference circuit 250 in FIG. 5. Referring to FIG. 6, blocks A, B, 1/R, and C represent gain blocks (e.g., buffers, amplifiers, etc.), for example, approximately the gains of transistor 272, resistor 274, transistor 265, and buffer 268 in reference circuit 250. The bandgap voltage, $V_{BG}$, results from summing the outputs of blocks A and B, i.e., from scaling $V_{PTAT}$ by A and B and summing the results. The reference current, $I_{REF}$, results from scaling $V_{PTAT}$ by 1/R, and the voltage $V_{TEMP}$ results from scaling $V_{PTAT}$ by C.

As noted, sensor ICs according to exemplary embodiments may include one or more GPIOs. The GPIOs may provide a variety of functions, for example, couple programmable fixed-current driver(s) to power external LED(s) used primarily for proximity detection or measurement, and the like. Generally, in some embodiments, the LED driver pin of the optical IC may be reconfigured as a general purpose input/output to enable other system functions. The different operating modes are enabled or disabled by bit controls from control registers, e.g., control register map 165.

The LED current level(s) is (are) programmable to provide illumination levels for different detection or measurement ranges. In one exemplary embodiment, up to three LEDs may be driven, depending on the complexity of proximity or motion detection/measurement being performed. One may use different numbers of LEDs, however, as desired, by making appropriate changes. Those changes fall within the knowledge and skill of persons of ordinary skill in the art.

The system battery potential may exceed the maximum voltage in the chosen IC semiconductor fabrication process technology. In an exemplary embodiment, the LED drivers are designed to tolerate this voltage level when the LEDs are turned off. This feature prevents damage to the IC when the LEDs are powered off and the LED package pins are pulled up by the system battery or supply source.

The large current source driver transistors used for LED illumination are also used to absorb electrostatic discharge (ESD) energy. A dv/dt sensor (a sensor for sensing the rate of change of voltage as a function of time) on one or more LED pin senses the voltage ramp on the pin, and turns on the output driver transistor during an ESD event. While in the on state, the driver device limits the voltage on the pin, thus preventing damage to circuitry within the sensor IC and/or system. In exemplary embodiments, the current output ramp rate is also controlled to limit inductive voltage drops (for example, because of parasitic inductance) and radiated electromagnetic energy.

In one exemplary embodiment, the LED drivers are also designed to enable analog and digital I/O on the same package pins. This feature enables nonvolatile memory programming access as well as debug and manufacturing test access. It also enables additional system-level functions described herein.

In exemplary embodiments, GPIOs may provide supplemental I/O functionality or modes. For example, in some embodiments, the principal I/O function, for example, LED driver output, is multiplexed with supplemental functions, such as a bidirectional current/voltage source, DAC output, ADC input, and implemented with the same I/O pin. In a typical application, the LED output is active during a limited period of time and is inactive otherwise. It is therefore possible to reconfigure and use the LED GPIO(s) for other functionality.

In one embodiment, a plurality of LED driver I/Os are used. Some of the driver I/Os may be re-configured to perform other functions as their primary purpose, or vary depending on the NVM code or external conditions (for example, automatic detection of the presence of LED(s), external sensor input, servo control output).

The supplemental analog I/O mode function allows interfacing external sensors or electrical quantities (for example, voltage, charge, current) to the internal ADC to perform other measurements (for example, humidity, passive infrared (PIR), temperature, light, and capacitance). In combination with the flexibility of NVM programming, various types of sensors may be realized by the sensor IC, as desired.

The external pin configuration (e.g., type of sensor, attached device digital ID, or measured electrical quantity) may be detected by the controller (e.g., controller 186 in the embodiment shown in FIG. 4) and the controller can execute code stored in the NVM specific to a momentary external configuration. An LED driver pin may output programmable current and voltage in two polarities. In exemplary embodiments, it is also possible to operate the LED driver simultaneously in a combination of functional modes (for example, an LED current can be turned on with the analog input active so the pin voltage can be measured internally by the ADC).

Figure 7:
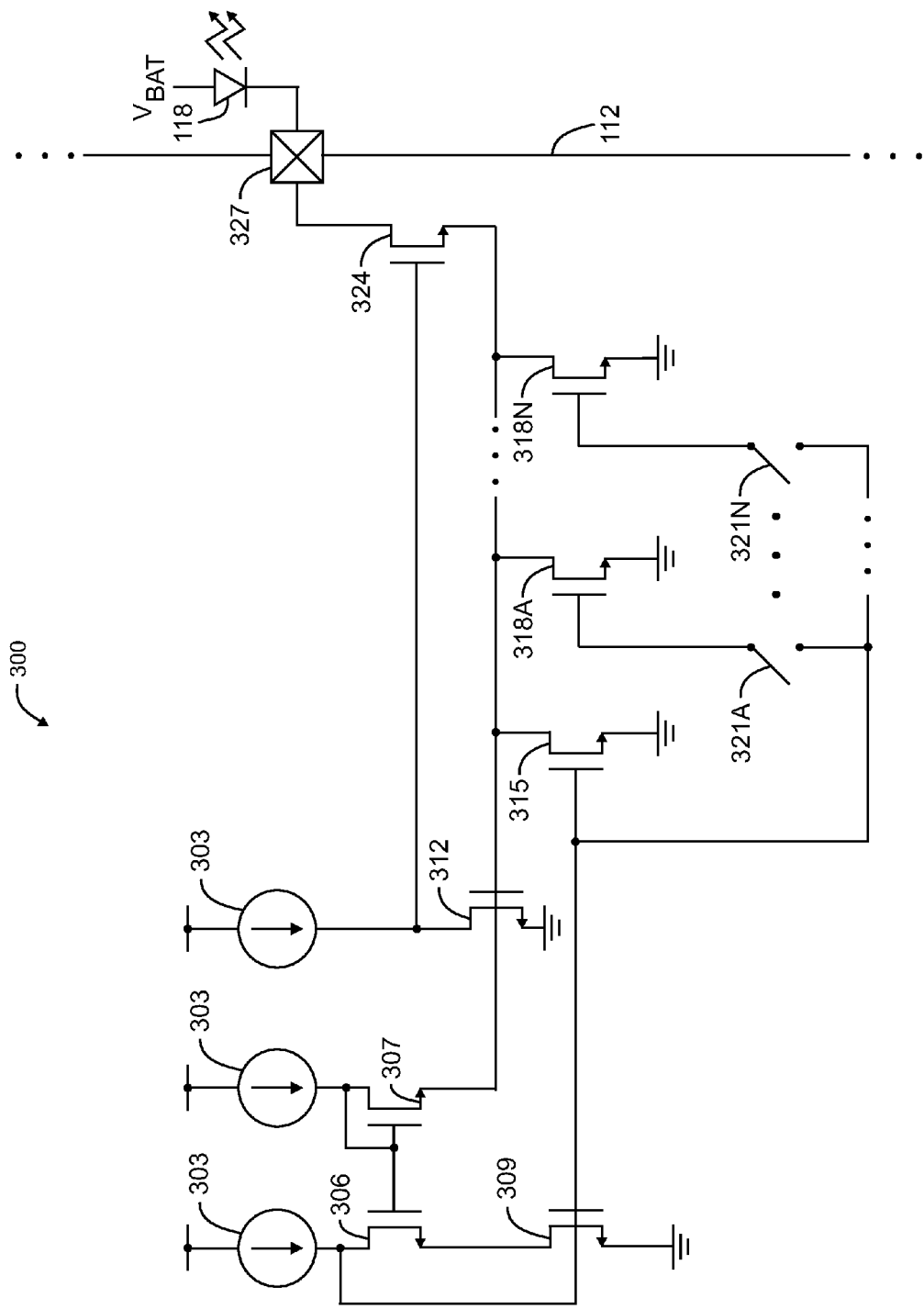
FIGS. 7-10 illustrate use of a GPIO or programmable or configurable I/O circuit to perform various input/output or driver functionality according to an exemplary embodiment.

FIGS. 7-10 illustrate use of GPIOs or a programmable I/O circuit to perform various input/output or driver functionality according to an exemplary embodiment. FIG. 7 shows a circuit schematic of a GPIO in the LED driver mode according to an exemplary embodiment. Current sources 303, which may be fixed or programmable, provide current to transistors 306, 307, and 312. Transistors 306, 307, 309, and 312 provide bias voltages to the gates of transistors 315 and 321A-321N. Transistor 315 provides a current path for the source current of transistor 324. (Note that transistor 315 may be turned off, if desired, by using additional control circuitry not shown in FIG. 7.)

The drain of transistor 324, via pin 327, conducts the supply current for LED 118 (shown as an external LED), provided by supply VBAT. One or more switch(es) 321A-321N allow the programming of the LED current. Switch(es) 321A-321N are programmable in response to programming signal(s) (not shown explicitly) elsewhere in sensor IC 112 or received from a source external to sensor IC 112. In response to the programming signal(s) switch(es) 321A-321N turn on and conduct current, thus increasing the LED current in one or more desired steps.

Figure 8:
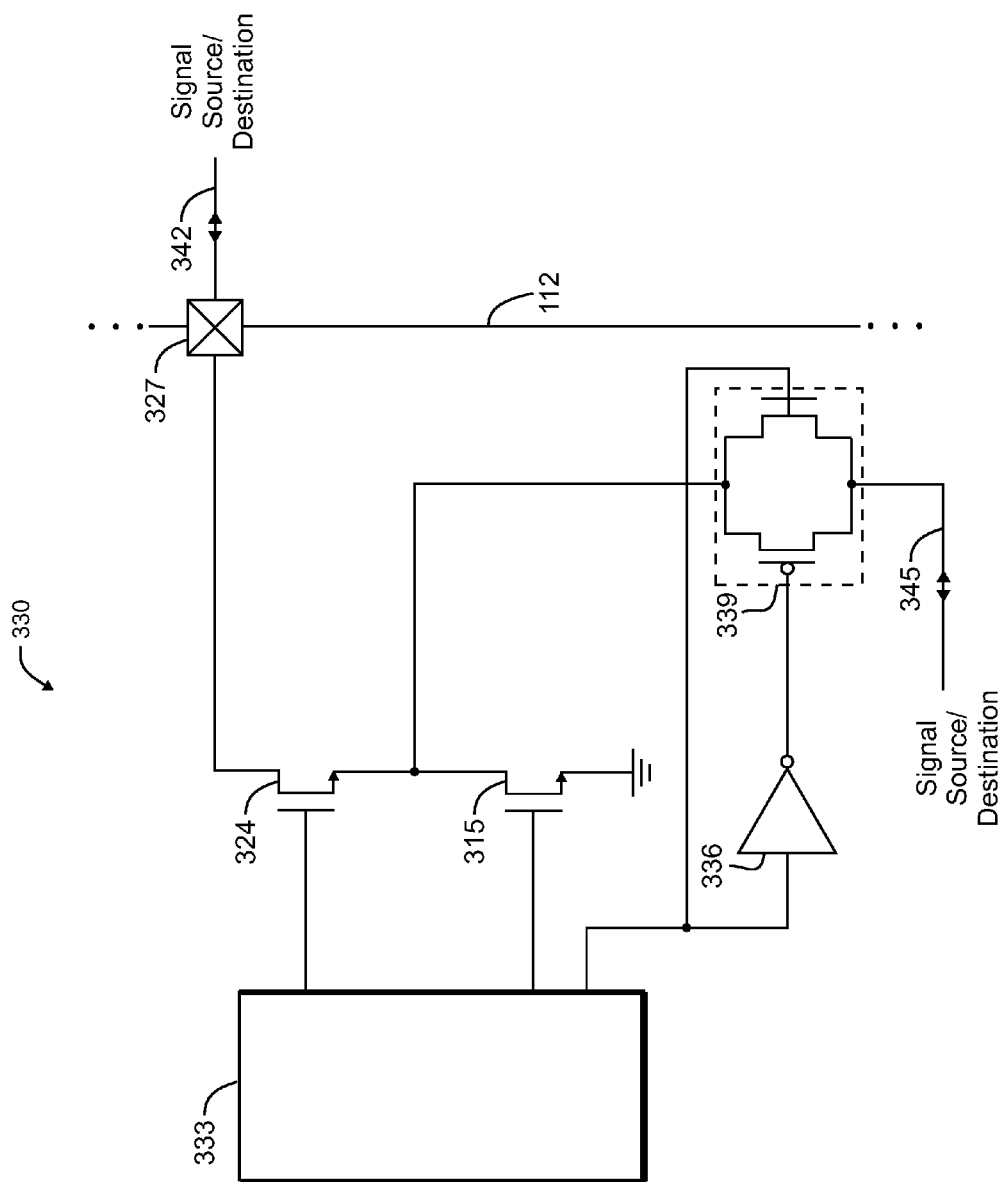

FIG. 8 shows a circuit configuration for provided analog I/O capability according to an exemplary embodiment. In this mode, in response to control signal(s) (not shown explicitly) control circuit 333 (for example, a MUX or similar circuit or device) causes transistor 324 to turn on, and transistor 315 to turn off.

Control circuit 333, via inverter 336, also provides control signals to analog transmission gate or switch 339, and causes analog transmission gate 339 to turn on. Consequently, analog transmission gate 339 couples external signal line 342 to internal signal line 345, and provides communication from circuitry internal to sensor IC 112 to/from circuitry external to sensor IC 112, as desired. Thus, an analog signal may be provided to sensor IC 112 via pin 327 for internal use, such as sensing, control, etc. Similarly, an analog signal may be provided from internal circuitry of sensor IC 112 for external use, for example, sensing, control, and the like.

Figure 9:
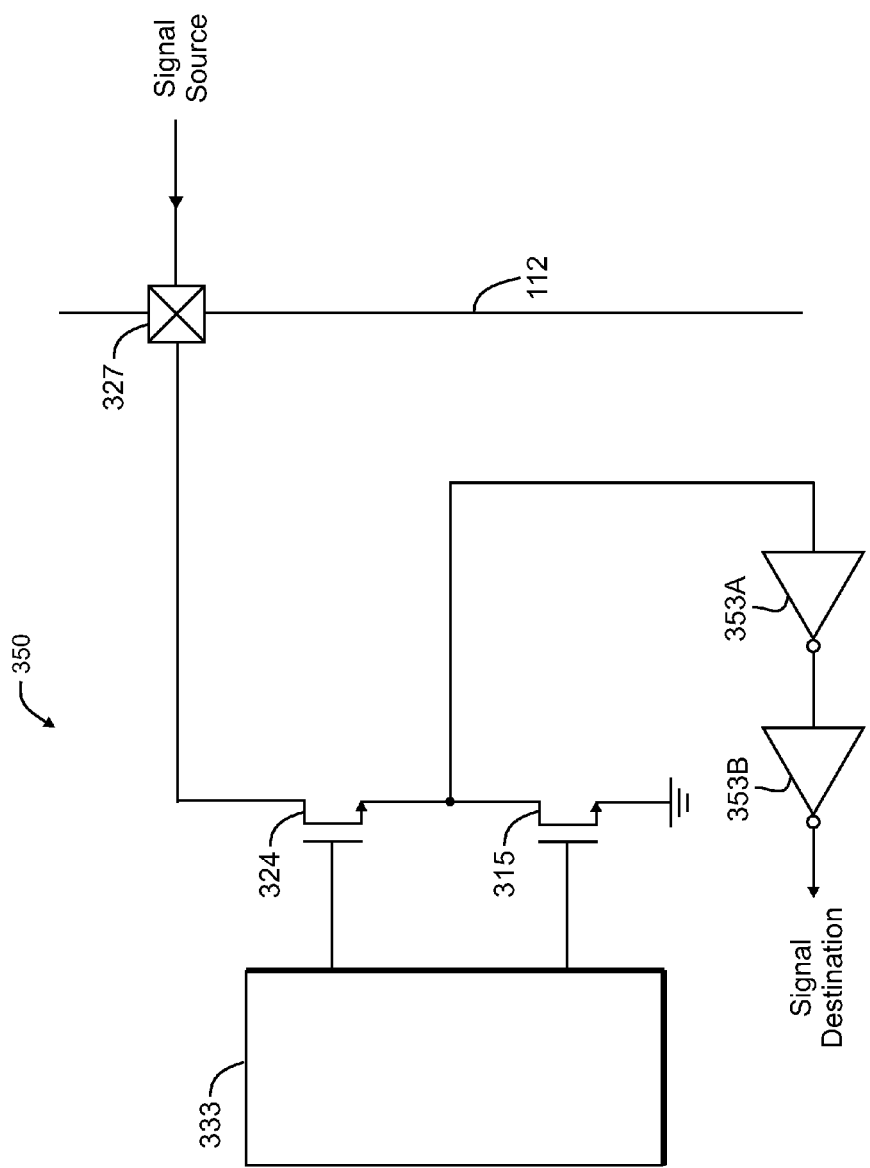

FIG. 9 depicts a circuit configuration for provided digital input capability according to an exemplary embodiment. In this mode, in response to control signal(s) (not shown explicitly) control circuit 333 causes transistor 324 to turn on, and transistor 315 to turn off. As a result, transistor 324 provides to inverters 353A-B a digital signal applied to pad 327 of sensor IC 112. Inverters 353A-B optionally provide buffering and conditioning of the input digital signal (e.g., to restore signal levels). The output of inverter 353B provides a buffered/restored version of the input digital signal to desired destination circuitry within sensor IC 112.

Figure 10:
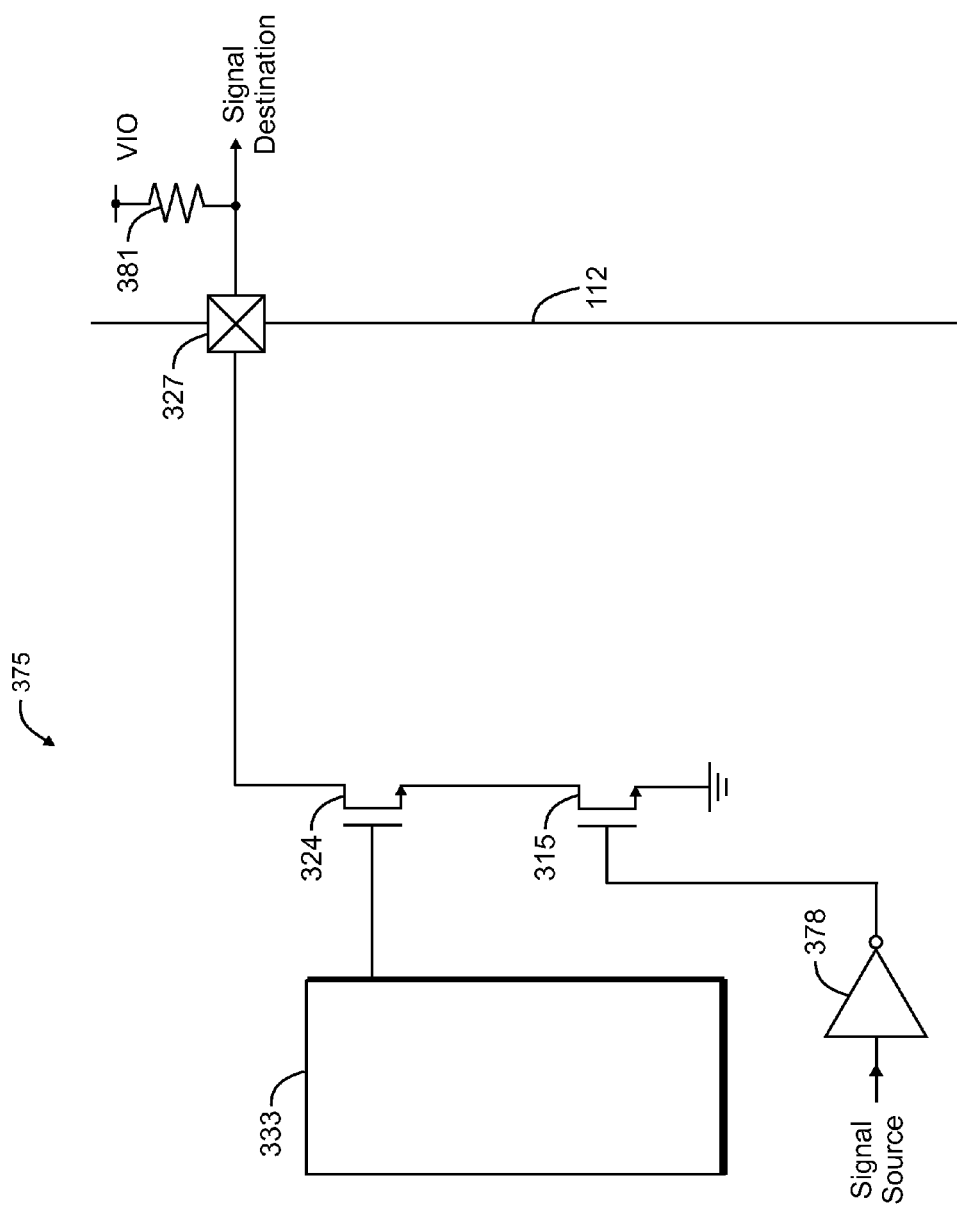

FIG. 10 illustrates a circuit configuration for provided digital output capability according to an exemplary embodiment. In this mode, in response to control signal(s) (not shown explicitly) control circuit 333 causes transistor 324 to turn on, thus coupling pin 327 to the drain of transistor 315.

A digital signal (e.g., from the core circuitry of sensor IC 112 or any desired source circuitry within sensor IC 112) drives the input of inverter 378. The output of inverter 378 drives the gate of transistor 315. Thus, if the digital signal is a logic 0, inverter 378 causes transistor 315 to turn on, thus providing a logic 0 signal to pin 327. Conversely, if the digital signal is a logic 1, inverter 378 causes transistor 315 to turn off, thus allowing pull-up resistor 381 to pull pin 327 to a logic 1. In the embodiment shown, resistor 381 pulls up pin 327 to the voltage level of external supply voltage VIO (assuming no appreciable current flow through resistor 381).

In exemplary embodiments, on-chip detectors are used to sense light that falls on the sensor IC through a transparent encapsulant via on-chip photodetectors. In typical applications, it is desirable to prevent or reduce light absorption in the semiconductor die outside the active optical area of the photodetectors, such that incident light does not interfere (or does not substantially interfere) with normal electrical operation of the IC.

In some embodiments, junction silicon photodiode may be used. A typical junction silicon photodiode in a substrate has a wide spectral response, with a peak in the infrared spectrum. Thus, by using an infrared light source as the stimulus for proximity detection or measurement, one may increase sensitivity. In one exemplary embodiment, a dual-junction vertical semiconductor p/n/p stack is used for photodetection. An upper p/n junction (p-active to n-well) is relatively shallow, and responds mainly to visible light spectrum. A bottom n/p junction (n-well to p-substrate) responds mostly to infrared light spectrum. The upper junction and the lower junction are used, respectively, to measure visible light for ambient light sensing (ALS) and proximity sensing (PS) but also for optional spectral correction of ALS.

In some embodiments, the upper and lower junctions are implemented as a plurality of vertical structures. A multiplexer can select an appropriate detector for each measurement mode (two identical structures with different optical areas are used in an exemplary embodiment).

If the infrared signal photodiode is constructed from a continuous Nwell in P substrate but also has a shorted P diffusion in the Nwell, the Nwell to P substrate diode will have relatively strong infrared response with a reduced visible component, especially if the Nwell is relatively deep (for example, on the order of 3 microns). Since the light absorption depth increases with wavelength, the shorter visible wavelengths get absorbed near the surface in the Nwell and the carriers get collected by the shorted P diffusion on top of the Nwell, while the longer wave infrared penetrates and get absorbed in the substrate, and the resulting carriers get collected by the Nwell.

This diode structure can reduce the visible component response that leaks through the infrared filter by one half. This diode structure may be used in exemplary embodiments, as desired.

As noted, one aspect of the disclosed concepts relates to power management, such as power management in sensor ICs and/or in systems that employ sensor ICs. A system containing one or more sensor ICs (for example, the systems in FIGS. 1-3), or a sensor IC, can use a number of strategies to reduce power consumption and operate relatively efficiently.

As described below in detail, the system or sensor IC operates blocks with relatively high power consumption at relatively low duty cycle(s) to reduce or minimize overall power consumption. Typically, some blocks operate continuously. To reduce overall power consumption, those blocks are optimized for relatively low power operation.

Generally speaking, a system containing one or more sensor ICs or a sensor IC according to exemplary embodiments has three modes of operation: process mode, convert mode, and sleep mode. Table 1 below shows blocks of circuitry that are active (or on) and inactive (or off) in various modes of operation in an exemplary embodiment:

TABLE 1

| Mode | Activities |
| --- | --- |
| Process | Controller 186 is active or on; LED drivers 177 and ADC 189 are inactive or off; other supporting circuitry are active or on, as desired, depending on application |
| Convert | Controller 186 is suspended; LED drivers 177 and ADC 189, and supporting circuitry are active or on |
| Sleep | PMU (part of 156) circuitry, serial I/O circuitry 159, and host interface circuitry 162 are active or on |

Figure 11:
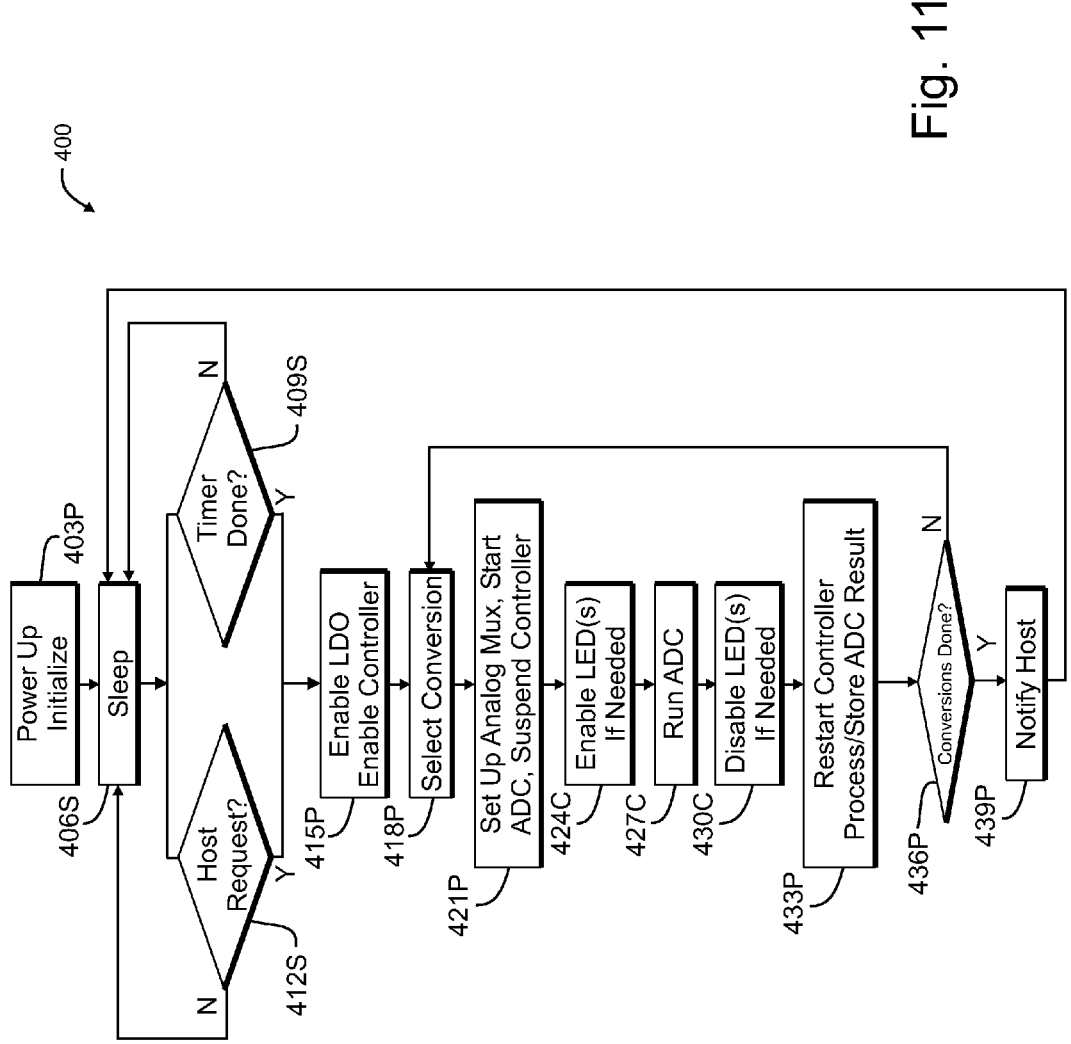
FIG. 11 shows a flow diagram of operations within a sensor IC or a system containing sensor IC(s) according to an exemplary embodiment.

FIG. 11 shows a flow diagram 400 of operations within a sensor IC or a system containing sensor IC(s) according to an exemplary embodiment. The labels for the various blocks indicate the mode of operation to which the block pertains. Specifically, a trailing "C" in the label indicates the block pertains to the convert mode, while trailing "S" and "P" in the label designate the block operation(s) as pertaining to the sleep and process modes, respectively. Thus, as examples, blocks 402P, 409S, and 427C in FIG. 11 pertain, respectively, to the process, sleep, and convert modes of operation.

Referring to FIG. 11, at 403P, the system or sensor IC (e.g., sensor IC 112 in FIG. 4) powers up and initializes. Subsequently, at 406S, the system or sensor IC enters the sleep mode or is run in the sleep mode.

One or both conditions (and/or other condition(s)) may cause the system or sensor IC to leave the sleep mode and enter another mode of operation: a host request, and a time-out or timer event or, generally, the passage of a given, desired, or programmed period of time. Referring to FIG. 11, while in the sleep mode, a check is made via block 412S for a host request. Similarly, at 409S a check is made for a time-out or the expiration of a time-period. For example, by using a timer, the system or sensor IC may be made to leave the sleep mode at desired intervals, at one or more desired points in time, etc.

In some embodiments, the checks in 412S and 409S occur at the same time. Generally, however, the checks may or may not occur simultaneously. Furthermore, in some embodiments, one of the checks may occur whereas, in other embodiments, both of the checks may occur.

Referring to FIG. 11, if a host request and/or time-out event exists, the system or sensor IC enters the process mode (is run in the process mode) at 415P. Otherwise, the sensor IC remains in the sleep mode (at 406S).

When the system or sensor IC leaves the sleep mode, at 415P, the LDO 171 and the controller 186 are enabled. At 418P, the desired conversion(s) is selected (e.g., conversion(s) for ambient light sensing, proximity sensing). At 421P, the analog MUX 192 is set up, the ADC 189 is started, and the controller 186 is suspended.

At 424C, the system or sensor IC enters the convert mode (is run in the process mode) of operation. More specifically, at 424C, LEDs 118 are enabled if needed or desired. At 427C, ADC 189 is run or enabled, i.e., used to perform analog-to-digital conversion. At the conclusion of that operation, at 430C, LEDs 118 are disabled if needed or desired (and if enabled at 424C). The system or sensor IC then enters the process mode (is run in the process mode).

Specifically, at 433P, the controller 186 is restarted. The results of the analog-to-digital conversion are processed, stored, etc., as desired. At 436P, a check is made to determine whether the desired conversions have concluded. If so, at 439P, the host is notified, and the system or sensor IC enters the sleep mode at 406S. If not, control returns to 418P to perform one or more additional conversions.

In exemplary embodiments, while powered, the system or sensor IC is mainly in sleep mode. Blocks of circuitry with relatively high power consumption are active when actively processing or performing desired functions. Since detection can be done relatively quickly, time spent in the sleep mode is maximized (i.e., power savings may be maximized or increased).

Figure 12:
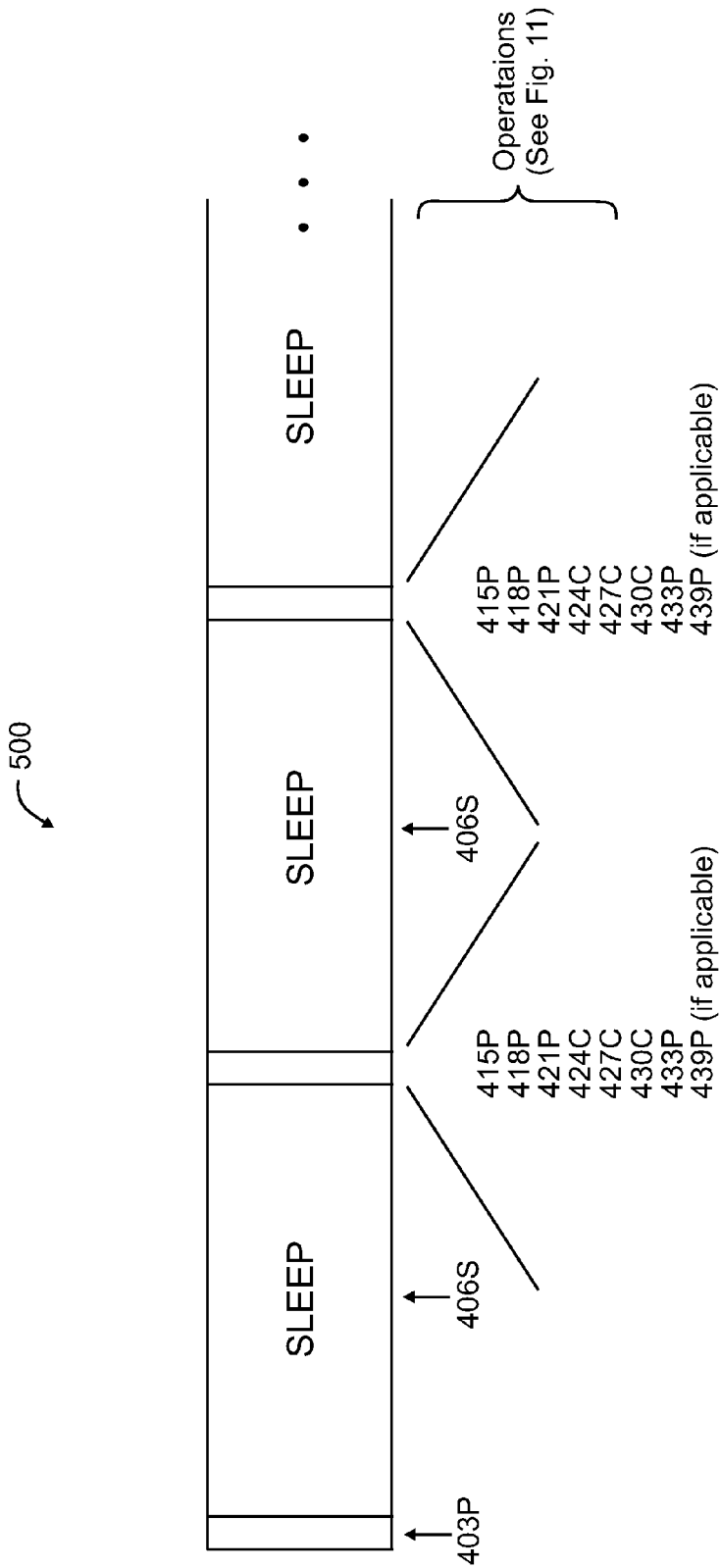
FIG. 12 illustrates a representative timeline depicting relative times of operation of the various modes in exemplary embodiments.

FIG. 12 shows a representative timeline 500 that depicts relative times of operation of the various modes in exemplary embodiments. Specifically, the timeline 500 shows the sequence of events or operational modes of a system or sensor IC by making reference to the blocks or operations in FIG. 11. Thus, the timeline 500 shows that the system or sensor IC starts by powering up and initializing (403P in FIG. 11), then enters the sleep mode (406S in FIG. 11), and then processes and converts information or data (e.g., 415P, 418P, 421P, 424C, 427C, 430C, 433P, and 439P in FIG. 11). This sequence of events may repeat one or more times, as desired.

As noted, various blocks or circuitry within the system or sensor IC in exemplary embodiments become active (on, enabled) or inactive (off, disabled) depending on the operational mode of the system or sensor IC. Table 2 below shows the state of various blocks or circuits depending on the operational mode. The blocks or circuits may constitute the blocks or circuits in various embodiments of a sensor IC (or systems containing one or more such ICs), for example, sensor IC 112 in FIG. 4.

TABLE 2

| | State of Block/Circuit in Various Modes | | |
| --- | --- | --- | --- |
| Block/Circuit | Sleep | Process | Convert |
| RTC, POR, PMU, Serial I/O, Host Interface | On | On | On |
| Bandgap, LDO, Brownout Detector, Oscillator, Watchdog | Off | On | On |
| LED driver(s), LED control, ADC, Analog MUX, Photodiode(s) | Off | Off | On |
| Controller Register Map, Controller (and NVM, if applicable) | Off | On | Off |

Thus, for the exemplary embodiment depicted, the LED driver(s), LED control, ADC, analog MUX, photodiode(s) are off in the sleep and process modes, but on in the convert mode. The RTC, POR, PMU, serial I/O, and the host Interface are on in all modes. The controller register map, the controller (and NVM, if applicable) are on in the process mode, but off in the sleep and convert modes of operation.

Note that the embodiments describe and shown for power management represent illustrative examples. Of course, one may devise and employ a wide variety of other power management schemes as desired, depending on such factors as design or performance specifications, available technologies (e.g., fabrication technologies), and the like.

Referring to the figures, note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art who have the benefit of this disclosure. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An apparatus, comprising:
a sensor integrated circuit (IC), adapted for ambient light sensing (ALS) and/or proximity detection, the sensor integrated circuit (IC) comprising:
an integrated analog-to-digital converter (ADC) adapted to convert at least one signal related to ambient light sensing (ALS) and/or proximity detection to at least one digital signal;
an integrated light emitting diode (LED) driver adapted to drive at least one light emitting diode (LED); and
an integrated power management unit (PMU) adapted to reduce power dissipation of the sensor integrated circuit (IC) by running at a low duty cycle the integrated light emitting diode (LED) driver and the integrated analog-to-digital converter (ADC), and by suspending a controller of the sensor integrated circuit (IC).

2. The apparatus according to claim 1, wherein the integrated light emitting diode (LED) driver is adapted to provide a programmable drive current to the at least one light emitting diode (LED).

3. The apparatus according to claim 1, wherein the sensor integrated circuit (IC) further comprises an integrated photodetector adapted to detect infrared ambient light.

4. The apparatus according to claim 1, wherein the sensor integrated circuit (IC) further comprises an integrated photodetector adapted to detect visible ambient light.

5. The apparatus according to claim 1, wherein the sensor integrated circuit (IC) further comprises an integrated photodetector adapted to detect proximity of an object.

6. The apparatus according to claim 1, further comprising an integrated controller adapted to control operation of the integrated analog-to-digital converter (ADC) and the integrated light emitting diode (LED) driver.

7. The apparatus according to claim 6, wherein the integrated power management unit (PMU) is adapted to enable the controller when the integrated light emitting diode (LED) driver is to drive the at least one light emitting diode (LED).

8. The apparatus according to claim 6, wherein the integrated power management unit (PMU) is adapted to enable the integrated analog-to-digital converter (ADC) when the at least one signal related to ambient light sensing (ALS) and/or proximity detection is to be converted to the at least one digital signal.

9. A method of sensing light using a sensor integrated circuit (IC), the method comprising:
(i) running the sensor integrated circuit (IC) in a sleep mode;
(ii) running the sensor integrated circuit (IC) in a convert mode upon occurrence of at least one condition, wherein during the convert mode the sensor integrated circuit (IC) converts at least one signal related to ambient light sensing (ALS) and/or proximity detection to at least one digital signal while suspending a controller of the sensor integrated circuit (IC); and
(iii) running the sensor integrated circuit (IC) in a process mode to process the at least one digital signal.

10. The method according to claim 9, further comprising (iv) running the sensor integrated circuit (IC) back in the sleep mode.

11. The method according to claim 9, wherein the at least one condition comprises a request received from a host processor.

12. The method according to claim 9, wherein the at least one condition comprises passage of a period of time.

13. The method according to claim 9, wherein running the sensor integrated circuit (IC) in the convert mode comprises enabling at least one light emitting diode (LED).

14. The method according to claim 13, wherein running the sensor integrated circuit (IC) in the convert mode further comprises enabling an analog-to-digital converter (ADC).

15. The method according to claim 14, wherein running the sensor integrated circuit (IC) in the convert mode to perform ambient light sensing further comprises disabling at least one light emitting diode (LED).

16. The method according to claim 9, wherein running the sensor integrated circuit (IC) in the process mode comprises processing a result of converting at least one signal related to ambient light sensing (ALS) and/or proximity detection to the at least one digital signal.

17. The method according to claim 16, further comprising notifying a host processor.

18. A method of sensing light using a sensor integrated circuit (IC), the method comprising:
running a light emitting diode (LED) driver to drive at least one light emitting diode (LED);
sensing ambient light and/or reflected light from an object for proximity detection to generate at least one analog signal; and
running with a low duty cycle an analog-to-digital converter (ADC) to convert the at least one analog signal into at least one digital signal and suspending a controller of the sensor integrated circuit (IC).

19. The method according to claim 18, wherein running the light emitting diode (LED) driver further comprises providing a programmable drive current to the at least one light emitting diode (LED).

20. The method according to claim 18, further comprising processing the at least one digital signal using a controller.

21. The method according to claim 20, further comprising using the controller to control operation of the analog-to-digital converter (ADC).

22. The method according to claim 20, further comprising using the controller to control operation of the light emitting diode (LED) driver.

23. The method according to claim 18, wherein sensing ambient light and/or reflected light from an object for proximity detection further comprises sensing ambient visible light.

24. The method according to claim 18, wherein sensing ambient light and/or reflected light from an object for proximity detection further comprises sensing ambient infrared light.

* * * * *